US011305915B2

(12) United States Patent
Jeon

(10) Patent No.: US 11,305,915 B2
(45) Date of Patent: Apr. 19, 2022

(54) PORTABLE MULTI-KIT ASSEMBLY FOR STORING ELECTRONIC PARTS

(71) Applicant: Won Jeon, Gwangju-si (KR)

(72) Inventor: Won Jeon, Gwangju-si (KR)

( * ) Notice: Subject to any disclaimer, the term of this patent is extended or adjusted under 35 U.S.C. 154(b) by 443 days.

(21) Appl. No.: 16/342,234

(22) PCT Filed: Dec. 28, 2018

(86) PCT No.: PCT/KR2018/016909
§ 371 (c)(1),
(2) Date: Apr. 16, 2019

(87) PCT Pub. No.: WO2020/017715
PCT Pub. Date: Jan. 23, 2020

(65) Prior Publication Data
US 2021/0331835 A1    Oct. 28, 2021

(30) Foreign Application Priority Data

Jul. 17, 2018    (KR) ........................ 10-2018-0082658

(51) Int. Cl.
*B65D 85/30*    (2006.01)
*B65D 25/04*    (2006.01)
(Continued)

(52) U.S. Cl.
CPC .............. *B65D 25/04* (2013.01); *A45C 11/18* (2013.01); *A45C 13/02* (2013.01); *B65D 85/70* (2013.01);
(Continued)

(58) Field of Classification Search
CPC .... B65D 25/04; B65D 75/323; B65D 75/327; B65D 85/70; A45C 11/18; A45C 13/02;
(Continued)

(56) References Cited

U.S. PATENT DOCUMENTS 4,615,441 A * 10/1986 Nakamura ........... H05K 7/1023
206/724
4,901,853 A *  2/1990 Maryatt ............ H01L 21/67356
206/454

(Continued)

FOREIGN PATENT DOCUMENTS

JP         H08-133380 A    5/1996
JP            3628130 B2    3/2005
(Continued)

*Primary Examiner* — Luan K Bui
(74) *Attorney, Agent, or Firm* — KORUS Patent, LLC; Seong Il Jeong

(57) ABSTRACT

A portable multi-kit assembly for storing electronic parts according to the present invention includes a base in which a plurality of accommodation portions configured to accommodate electronic parts is formed. The plurality of accommodation portions includes a first accommodation portion configured to accommodate a first part. The first part is fastened to the first accommodation portion, and is coupled to a first coupling kit having a shape corresponding to that of the first accommodation portion and accommodated in the first accommodation portion. A grip portion is foiled on the first coupling kit, and allows the first part to be withdrawn from or retracted into the base in such a manner that the grip portion is pushed with a finger.

12 Claims, 11 Drawing Sheets

(51) Int. Cl.
*A45C 11/18* (2006.01)
*A45C 13/02* (2006.01)
*B65D 85/00* (2006.01)

(52) U.S. Cl.
CPC ... *A45C 2011/188* (2013.01); *A45C 2013/025* (2013.01)

(58) Field of Classification Search
CPC ........ A45C 2011/188; A45C 2013/025; H01L 21/6735
USPC ................ 206/223, 707, 708, 722, 723, 725
See application file for complete search history.

(56) References Cited

U.S. PATENT DOCUMENTS

| | | | | |
|---|---|---|---|---|
| 5,203,454 | A * | 4/1993 | Strong | B65D 25/10 206/560 |
| 7,395,933 | B2 * | 7/2008 | Ruth | H01L 21/68728 206/454 |
| 8,258,804 | B2 * | 9/2012 | Shim | G01R 31/2893 324/756.02 |
| 8,430,245 | B2 * | 4/2013 | Ziganto | B65D 73/02 206/714 |
| 2007/0296419 | A1 * | 12/2007 | Aizawa | G01R 31/2893 324/537 |

FOREIGN PATENT DOCUMENTS

| | | |
|---|---|---|
| JP | 2008-023295 A | 2/2008 |
| KR | 10-2015-0051866 A | 5/2015 |

* cited by examiner

PORTABLE MULTI-KIT ASSEMBLY FOR STORING ELECTRONIC PARTS

TECHNICAL FIELD

The present invention relates generally to a portable multi-kit assembly for storing electronic parts, and more specifically to a portable multi-kit assembly that can accommodate and carry various electronic parts without concern about loss and damage, has an excellent appearance, and is robust.

BACKGROUND ART

With the recent diversification and development of electronic devices, many electronic parts attachable to and detachable from electronic devices, such as chips, USIMs, or memory used for electronic devices, electronic pens intended to operate electronic devices, or the like, have appeared. Meanwhile, since these electronic parts are compact and small, disadvantages arise in that they are likely to be lost, they are not easy to find when they are lost, and it is difficult to easily find where they are placed when necessary. In particular, when a user goes out for a long time for a tour or business trip, it is troublesome to possess and carry electronic parts to be replaced or added, and care should be taken not to be lost or damaged.

Meanwhile, as an example of technology proposed for the purpose of arranging and accommodating parts, Korean Utility Model Registration No. 20-446324 discloses a part storage container including: a case configured to have an open front, shelves configured to partition the internal space of the case, vertical panels configured to be withdrawn through the open front of the case, and boxes configured to be attached to and detached from the left and rights of the vertical panels and to store parts therein, wherein the vertical panels and the boxes are installed inside the internal space partitioned by the shelves. Korean Patent No. 10-0592703 discloses a multi-panel type case for storing LCD parts, wherein rectangular or square spaces are formed according to variously sized holes suitable for parts or commercial LCD display panels, segmental panels are designed/fabricated by division into various sizes according to the sizes of parts and the shapes of the front and back sides of the case, and an electronic circuit designer or consumers are allowed to select desired segmental panels according to the types of parts to be placed on the front and back sides of the case from among the fabricated panels for fastening parts. However, since these conventional technologies are basically configured such that a user arranges relatively bulky members or parts in selected spaces, they are disadvantageous in terms of the compactness of a case and are poor in merchantability. Therefore, they are not suitable for use as a compact case for storing electronic parts.

DISCLOSURE

Technical Problem

Therefore, it is an object of the present invention to provide a compact and light portable multi-kit assembly for storing electronic parts, which can accommodate a plurality of small electronic parts.

It is another object of the present invention to provide a portable multi-kit assembly for storing electronic parts, which allows electronic parts to be easily checked and also allows individual parts to be conveniently withdrawn and retracted.

Technical Solution

In order to accomplish the above objects, the present invention provides a portable multi-kit assembly for storing electronic parts, the portable multi-kit assembly including a base in which a plurality of accommodation portions configured to accommodate electronic parts is formed, wherein the plurality of accommodation portions includes a first accommodation portion configured to accommodate a first part, the first part is fastened to the first accommodation portion and is coupled to a first coupling kit having a shape corresponding to that of the first accommodation portion and accommodated in the first accommodation portion, and a grip portion is formed on the first coupling kit and allows the first part to be withdrawn from or retracted into the base in such a manner that the grip portion is pushed with a finger.

The first accommodation portion may include a long rectangular first main accommodation portion and a small, long rectangular first auxiliary accommodation portion protruding from one side of the first main accommodation portion, a first stop portion may be formed to protrude from one side of the first auxiliary accommodation portion, and a first fastening portion may be formed to protrude from one end of the first auxiliary accommodation portion.

The first coupling kit may include a body and a grip portion protruding upward from a top surface of one side of the body, a guide configured to accommodate the first part may be formed at a center of the body, a hook may be formed from one side of the body in an integrated manner, and a catch protrusion having the same shape as the first stop portion may be formed on a side surface of the hook, so that the first coupling kit is slidable between a retracted position in which the catch protrusion engages with the first stop portion of the first accommodation portion and an advanced position in which the catch protrusion engages with the first fastening portion of the first accommodation portion.

The first part may be a pen or electronic pen, which is a writing tool.

The plurality of accommodation portions may include a second accommodation portion configured to accommodate a second part, the second part may be fastened to the second accommodation portion and may be coupled to a second coupling kit having a shape corresponding to that of the second accommodation portion and accommodated in the second accommodation portion, and a grip portion may be formed on the second coupling kit and may allow the second part to be withdrawn from or retracted into the base in such a manner that the grip portion is pushed with a finger.

The second accommodation portion may include a long rectangular second main accommodation portion and a small, long rectangular second auxiliary accommodation portion protruding from one side of the second main accommodation portion, a second stop portion may be formed to protrude from one side of the second auxiliary accommodation portion, a second fastening portion may be formed to protrude from one end of the second auxiliary accommodation portion, the second coupling kit may include a body and a grip portion protruding upward from the top surface of one side of the body, a guide configured to accommodate the second part may be formed at the center of the body, a hook may be formed from one side of the body in an integrated manner, and a catch protrusion having the same shape as the second stop portion may be formed on a side surface of the hook, so that the second coupling kit is slidable between a retracted position in which the catch protrusion engages with the second stop portion of the second accommodation portion and an advanced position in which the catch protrusion engages with the second fastening portion of the second accommodation portion.

The second part may be a reset pin configured to reset a mobile phone.

The plurality of accommodation portion may further include a third accommodation portion configured to accommodate a third part, and the third part may be a hybrid-type composite connector in which a plug-side first module and an electronic device-side second module are formed in a body and the first and second modules are connected to each other by a signal line inside the body. The plurality of accommodation portion may further include a fourth accommodation portion configured to accommodate a fourth part and a fifth accommodation portion, the fourth part may be an adaptor, and the fourth accommodation portion and the fifth accommodation portion may be arranged adjacent to each other side by side.

The plurality of accommodation portion may further include a sixth accommodation portion configured to accommodate a sixth part, a pair of auxiliary frames configured to accommodate electronic parts may be inserted into the sixth accommodation portion from left and right side surfaces of the sixth accommodation portion and face each other, each of the auxiliary frames may be divided into an inner first compartment and an outer second compartment by a crossbar, the first compartment may accommodate a nano-USIM, and the second compartment may accommodate an SD card.

The portable multi-kit assembly may further include a cover which selectively opens and closes the base, and windows may be formed in the cover so that the first and second parts seated on the first and second accommodation portions, respectively, are checked with eyes and are withdrawn or retracted.

The first coupling kit may include a body configured to accommodate the first part and a first flap portion integrated with the body on one side surface of the body through a connecting portion, and a grip portion on which depressions and protrusions are formed such that the grip portion is pushed with a finger may be formed on the top surface of the first flap portion.

The second coupling kit may include a body configured to accommodate the second part and a second flap portion integrated with the body on one side surface of the body through a connecting portion, and a grip portion on which depressions and protrusions are formed such that the grip portion is pushed with a finger may be formed on the top surface of the second flap portion.

Advantageous Effects

The present invention provides an effect of providing the robust and compact portable multi-kit assembly for storing electronic parts, which allows electronic parts to be conveniently accommodated and withdrawn.

The present invention provides an effect of providing the portable multi-kit assembly for storing electronic parts, which eliminates the risk of loss of electronic parts required during a tour or business trip, is convenient, and has excellent merchantability.

DESCRIPTION OF DRAWINGS

FIG. 2b is a perspective view showing operations of advancing and retracting the first coupling kit shown in FIG. 2a;

FIG. 3b is a perspective view showing operations of advancing and retracting the second coupling kit shown in FIG. 3a;

BEST MODE

The structure of a portable multi-kit assembly 1 for storing electronic parts according to the present invention will be described in detail below with reference to the accompanying drawings.

Figure 1:
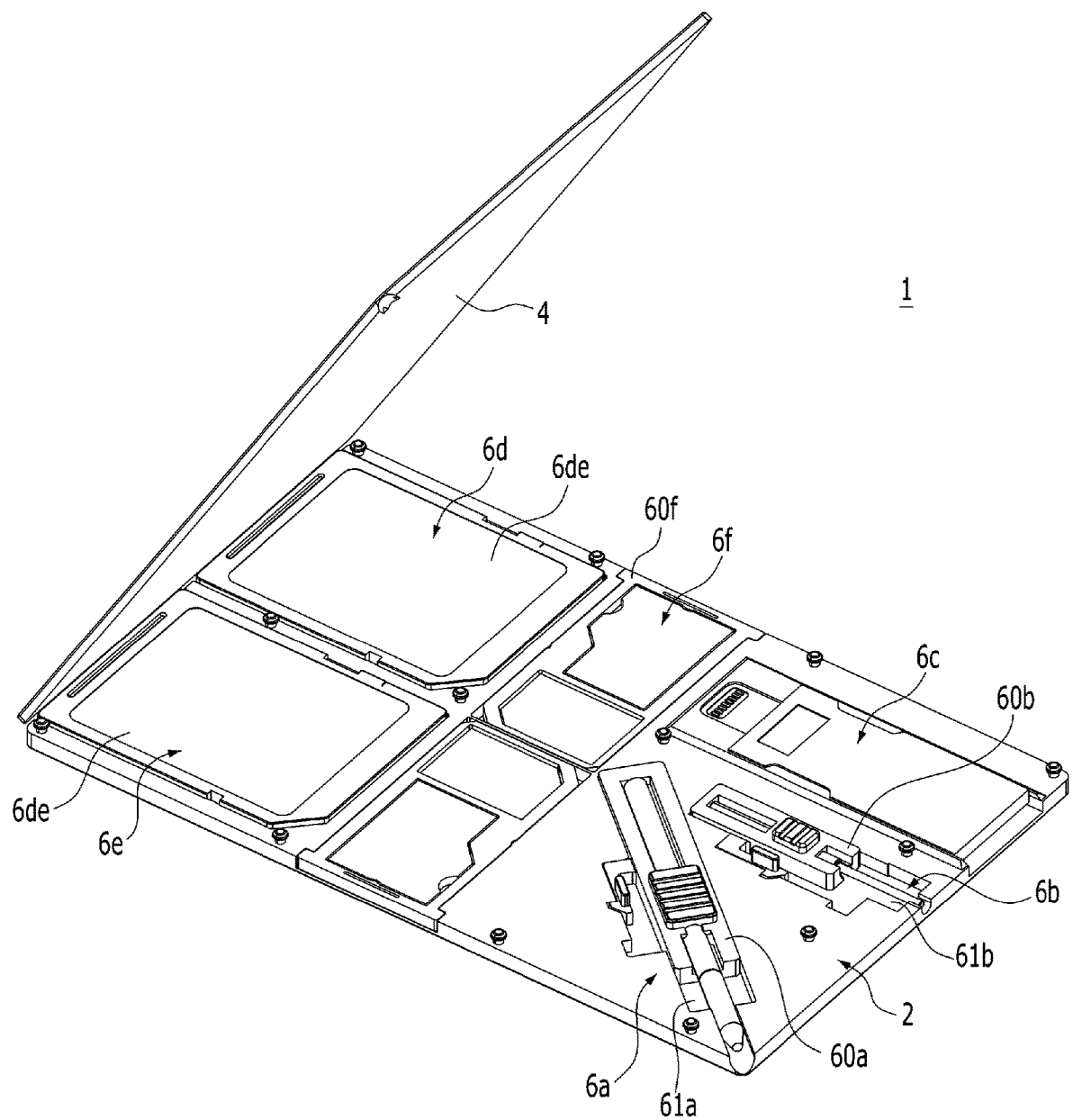
FIG. 1 is a perspective view showing a state in which the cover of a portable multi-kit assembly for storing electronic parts according to the present invention has been opened.

The portable multi-kit assembly 1 for storing electronic parts according to the present invention includes a base 2 and a cover 4, as shown in FIG. 1, and is made of rigid plastic and partially made of a transparent glass material. A window formed in the cover 4 is omitted for the convenience of illustration.

The base 2 is rectangular in shape, and is 4 to 6 cm in width and 7 to 9 cm in length. First, second, . . . , sixth concave accommodation portions 6a, 6b, . . . , 6f configured to accommodate electronic parts are formed on the base 2, and the edges of each of the accommodation portions are composed of boundaries having a height of about 2 to 3 mm. Some electronic parts are accommodated in the state of being coupled to first and second coupling kits 60a and 60b fastened to the first and second accommodation portions 6a and 6b, and other electronic parts are directly seated on or fastened to the individual accommodation portions 6c, 6d, 6e and 6f without coupling kits or with auxiliary frames.

The accommodation portions, coupling kits, and accommodation target electronic parts of the present invention will be sequentially described below.

Figure 2A:
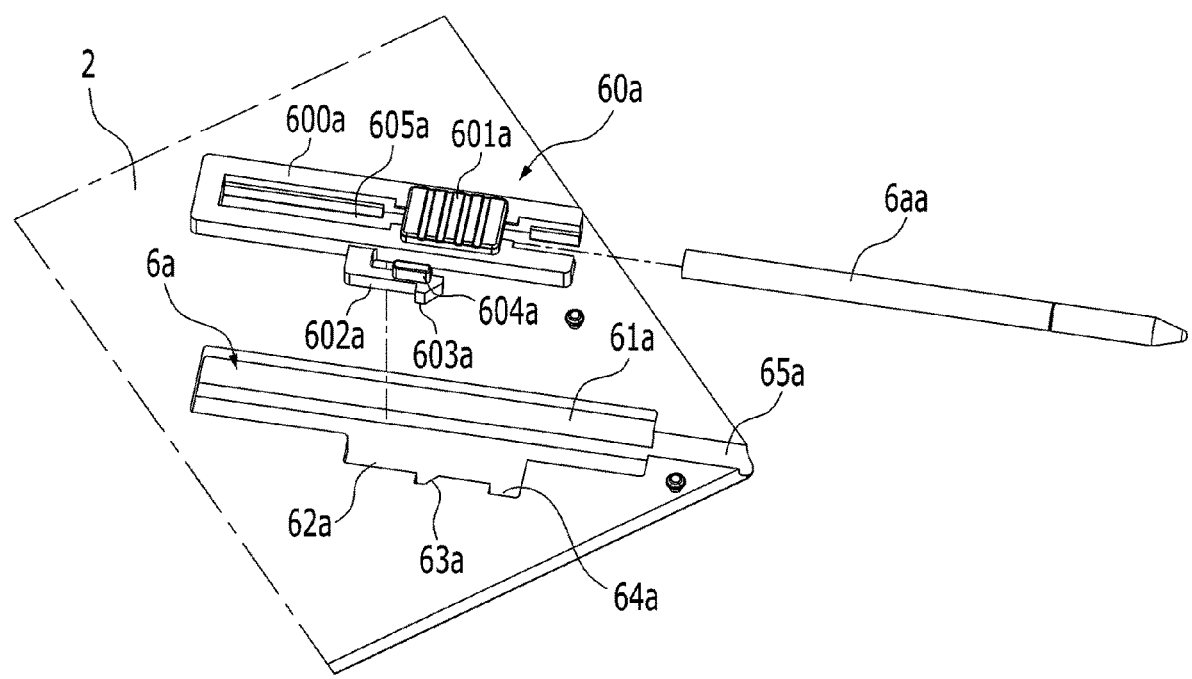
FIG. 2a is a perspective view of a first accommodation portion and a first coupling kit according to the present invention.
Figure 2B:
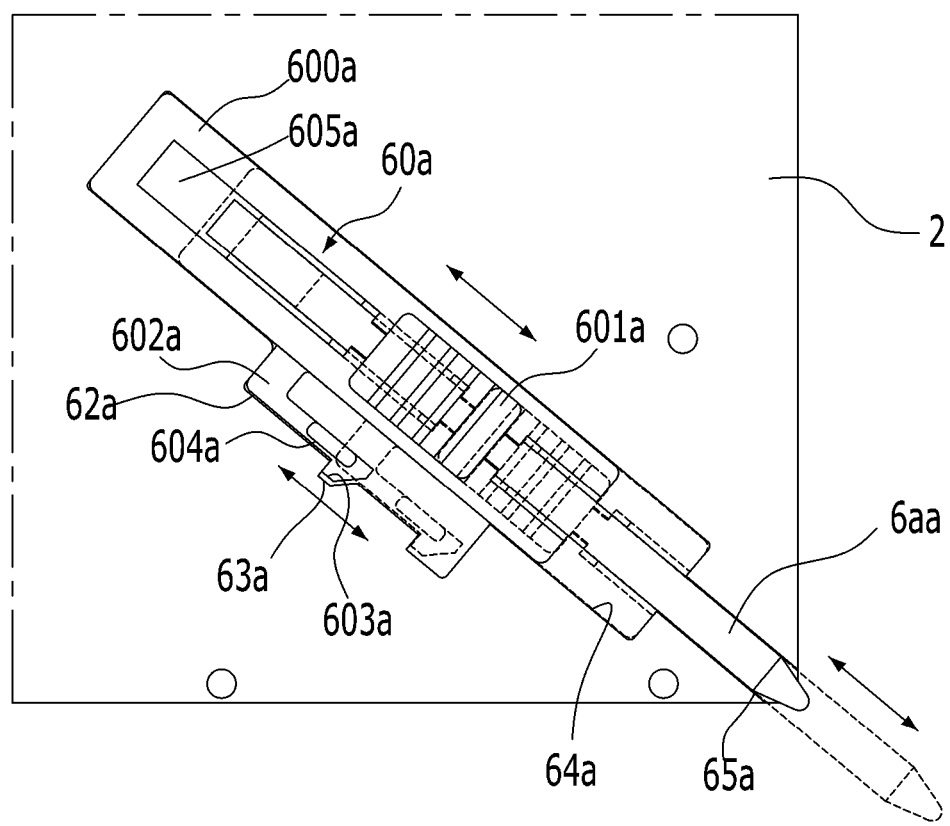

First, as shown in FIGS. 2a-2b, the first accommodation portion 6a is located on a diagonal line extending from one vertex of the base 2 to another opposite side. The first accommodation portion 6a includes a long rectangular first main accommodation portion 61a and a small, long rectangular first auxiliary accommodation portion 62a protruding downward from one side of the first main accommodation portion 61a. A small triangular first stop portion 63a is formed to protrude from a location near the center of one side of the first auxiliary accommodation portion 62b, and a square first fastening portion 64a larger than the first stop portion 63a is formed to protrude from one end of the first auxiliary accommodation portion 62a. A first guide 65a configured to guide an accommodation target part a pen 6aa through its entry and exit is formed in the center portion of the front end of the first main accommodation portion 61a.

The first coupling kit 60a that is fastened to the first accommodation portion 6a basically has a shape complementary to that of the first accommodation portion 6a. The first coupling kit 60a includes a sideways "U"-shaped body 600a having a long length and a grip portion 601a protruding upward from the top surface of one side of the body 600a. The body 600a is branched in a bridge form, and the steel core-shaped long pen 6aa is inserted into a first long guide 605a formed in the center of the body 600a. The pen 6aa may be a writing tool or electronic pen. Depression and protrusion ribs are formed on the top surface of the grip portion 601a, and thus make it convenient to push and pull the grip portion 601a with a finger. An "L"-shaped small hook 602a is formed from one side of the body 600a in an integrated manner, and a catch protrusion 603a having the same shape as the first stop portion 63a is formed on the side surface of one end of the hook 602a. Furthermore, a rectangular first push portion 604a is formed on the top surface of one end of the hook 602a.

The first coupling kit 60a is fabricated by, for example, injection molding in an integrated manner, and is fitted into the first accommodation portion 6a by means of a press-fitting method and slidable therein.

In other words, as shown in FIG. 2b, the location of the first coupling kit 60a varies in such a manner that the first coupling kit 60a slides between a solid-line retracted position in which the catch protrusion 603a engages with the first stop portion 63a of the first accommodation portion 6a and a dotted-line advanced position in which the catch protrusion 603a engages with the first fastening portion 64a of the first accommodation portion 6a. The movement and location variation of the first coupling kit 60a is performed in such a manner that a user pushes or pulls the grip portion 601a or first push portion 604a with a finger. Accordingly, as described later, at least the grip portion 601a, the first push portion 604a, and their movement ranges need to be exposed through the window of the cover 4 and to be thus operated by a user. In the advanced position, the front end of the pen 6aa is sufficiently exposed, so that writing or screen pressing is facilitated and the replacement of the pen 6aa or the insertion of a new pen is possible. Even in the retracted position, the pen 6aa is slightly exposed, so that writing is possible and a cap may be worn on the pen 6aa in order to prevent the outside from being smeared with ink. The first coupling kit 60a according to the present invention is characterized in that it is a novel assembly that has not been well known or commercialized so far.

Next, the second accommodation portion 6b and the second coupling kit 60b according to the present invention have shapes similar to those of the first accommodation portion 6a and the first coupling kit 60a, respectively, and are formed in smaller sizes. The second coupling kit 60b is slidable inside the second accommodation portion 6b.

Figure 3A:
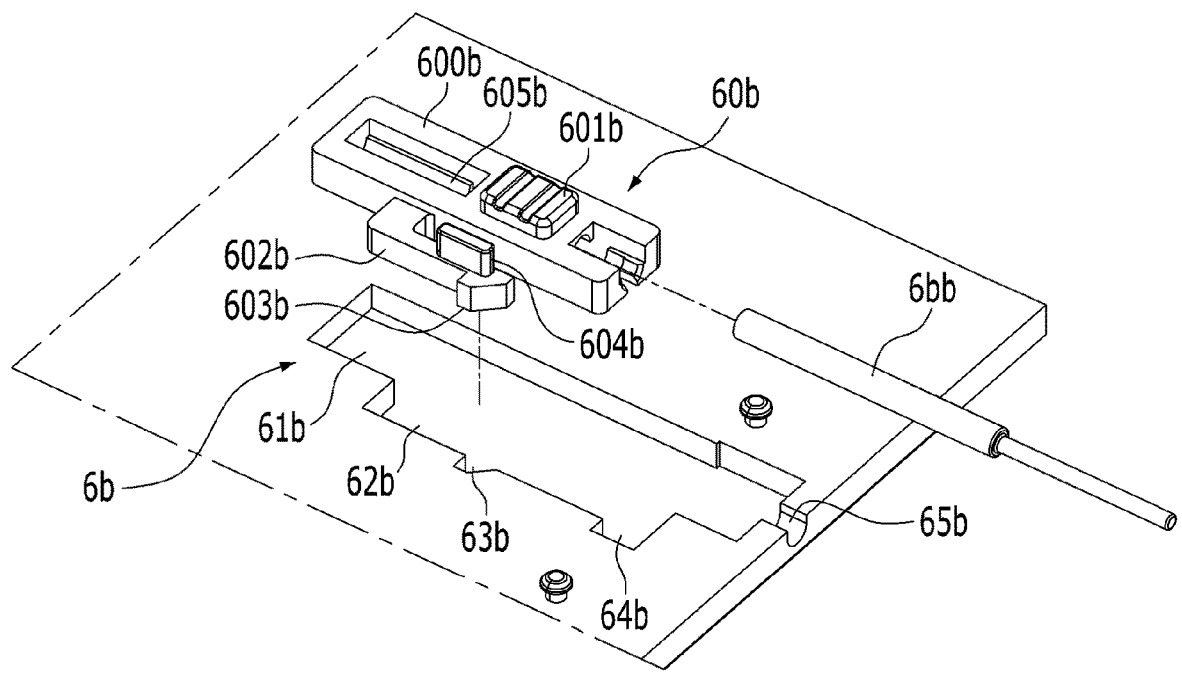
FIG. 3a is a perspective view of a second accommodation portion and a second coupling kit according to the present invention.
Figure 3B:
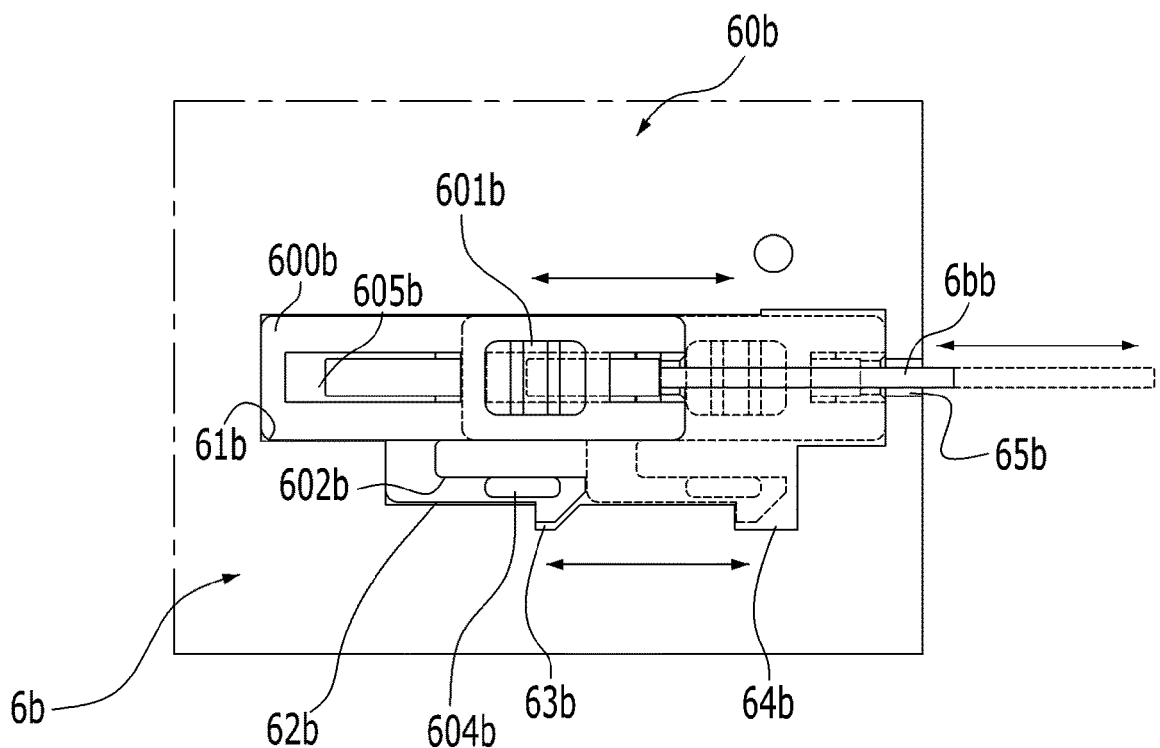

In other words, as shown in FIGS. 3a-3b, the second accommodation portion 6b is located on a horizontal line extending inward from a location near the center of one side of the base 2. The second accommodation portion 6b includes a long rectangular second main accommodation portion 61b and a small, long rectangular second auxiliary accommodation portion 62b protruding from one side of the second main accommodation portion 61b. A small triangular second stop portion 63b is formed to protrude from a location near the center of one side of the second auxiliary accommodation portion 62b, and a square second fastening portion 64b larger than the second stop portion 63b is formed to protrude from one end of the second auxiliary accommodation portion 62b. A second guide 65b configured to guide the accommodation target part—a reset pin— through its entry and exit is formed in the center portion of the front end of the second main accommodation portion 61b.

The second coupling kit 60b that is fastened to the second accommodation portion 6b basically has a shape complementary to that of the second accommodation portion 6b. The second coupling kit 60b includes a sideways "U"-shaped body 600b having a long length and a grip portion 601b protruding upward from the top surface of one side of the body 600b. The body 600b is branched in a bridge form, and a slender column-shaped reset pin 6bb is inserted into a second long guide 605b formed in the center of the body 600b. The reset pin 6bb is preferably intended to click on the reset button of a mobile phone.

The conventional reset pin is generally made of a metal plate, and is shaped such that an opening is formed and a front end tip protrudes. However, it is sufficient if the reset pin 6bb of the present invention is fabricated as a column-shaped steel core and inserted into the second long guide 605b, so that it is easily fabricated and may be used universally for devices other than a mobile phone. Alternatively, in a different manner, it is sufficient if the reset pin 6bb performs only the function of pushing a button unlike the pen 6aa, so that the reset pin 6bb is more advantageous in that it can be made of rigid plastic and can be integrated with the front end of the second coupling kit 60b in the form of a tip. In either case, it should be noted that the reset pin 6bb of the present invention and the second coupling kit 60b including the reset pin 6bb are novel items that have not been present so far.

Referring to FIG. 3a again, depression and protrusion ribs are formed on the top surface of the grip portion 601b, and thus make it convenient to push and pull the grip portion 601b with a finger. An "L"-shaped small hook 602b is formed from one side of the body 600b in an integrated manner, and a catch protrusion 603b having the same shape as the second stop portion 63b is formed at one end of the hook 602b. Furthermore, a rectangular second push portion 604b is formed on the top surface of one end of the hook 602b.

The second coupling kit 60b is fabricated by, for example, injection molding in an integrated manner, and is fitted into the first accommodation portion 6b by means of a press-fitting method and slidable therein.

In other words, as shown in FIG. 3b, the location of the second coupling kit 60b varies in such a manner that the second coupling kit 60b slides between a solid-line retracted position in which the catch protrusion 603b engages with the second stop portion 63b of the second accommodation portion 6b and a dotted-line advanced position in which the catch protrusion 603b engages with the second fastening portion 64b of the second accommodation portion 6b. The movement and location variation of the second coupling kit 60b is performed in such a manner that a user pushes or pulls the grip portion 601b or second push portion 604b with a finger. The grip portion 601b, the second push portion 604b, and their movement ranges need to be exposed through the window of the cover 4 and to be thus operated by a user. In the advanced position, the front end of the reset pin 6bb is sufficiently exposed, so that button pressing is facilitated and the replacement of the reset pin 6bb or the insertion of a new reset pen is possible (in the case where the reset pin 6bb is composed of a steel core and then attached. Even in the retracted position, the reset pin 6bb may be slightly exposed to press a button.

Next, the third accommodation portion 6c of the present invention and an electronic part that is accommodated in the third accommodation portion 6c will be described.

Figure 4:
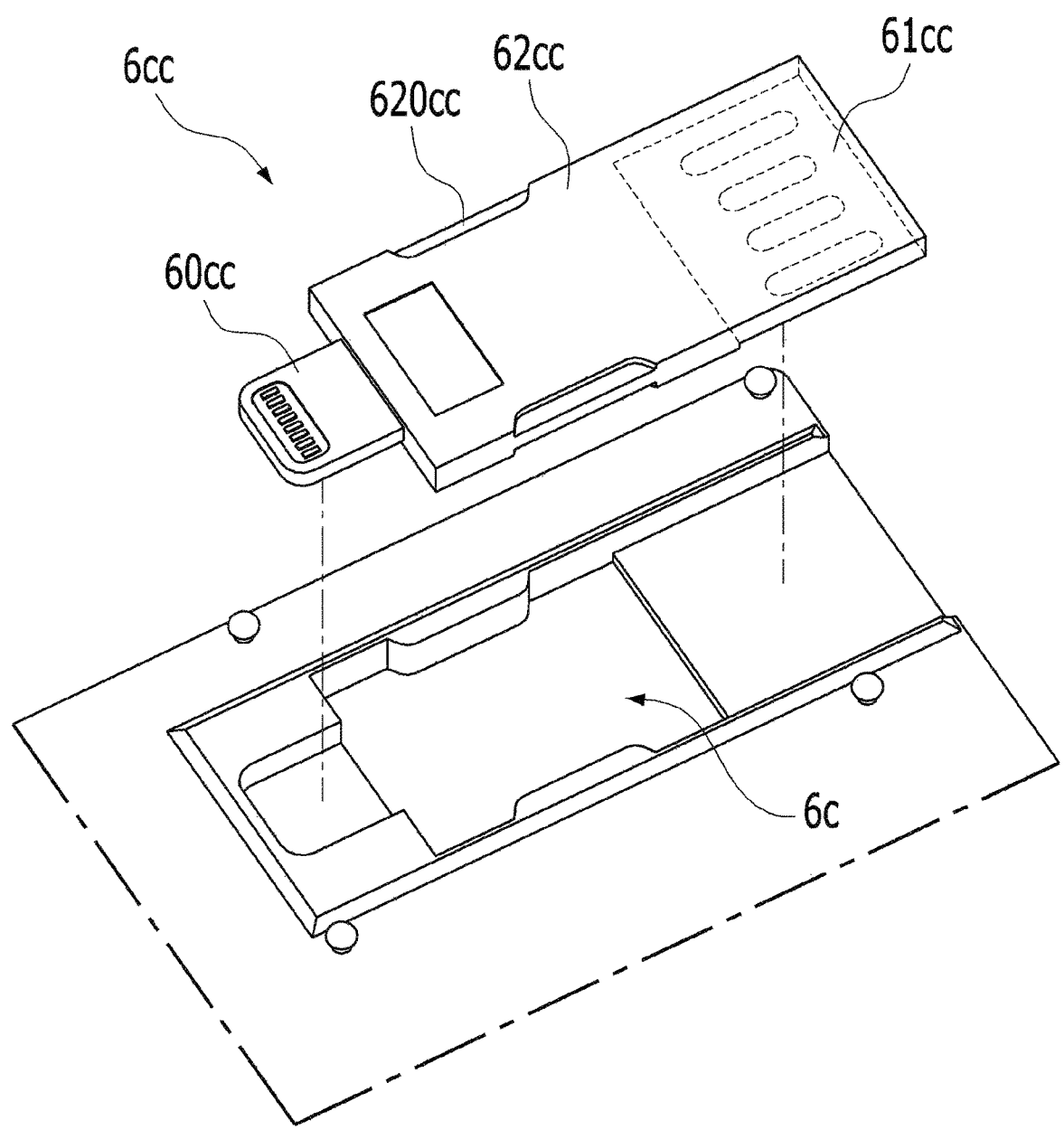
FIG. 4 is a perspective view of a third accommodation portion and a composite connector according to the present invention.

As shown in FIG. 4, the third accommodation portion 6c is formed in a rectangular shape having a long length above the second accommodation portion 6b. An empty square opening is formed in the front of the third accommodation portion 6c.

Figure 8:
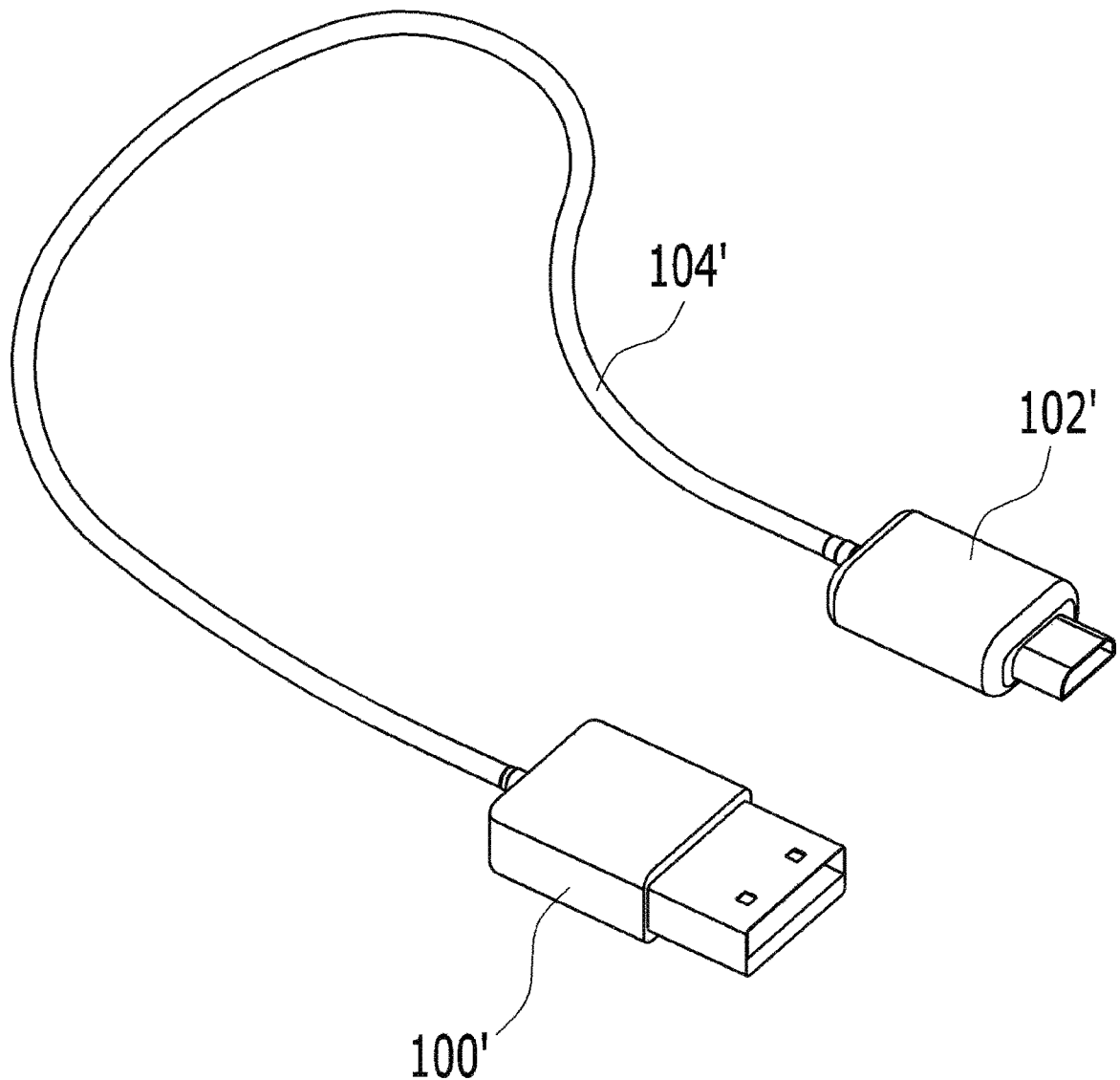
FIG. 8 is a perspective view showing a charging module according to conventional technology.

The present invention is characterized in that an accommodation target part that is inserted into the third accommodation portion 6c is a composite connector 6cc. Generally, a charging device for charging a mobile phone, a computer peripheral (a printer or the like), an everyday item (an electric shaver) or the like includes a plug-side first module 100,' an electronic device-side second module 102,' and a long cable 104' configured to connect the first module 100' and the second module 102' to each other, as shown in FIG. 8. In connection with this, the composite connector 6cc of the present invention is a hybrid type in which the first module 60cc and the second module 61cc are formed in the front (a front side in the drawing) and back of the body 62cc, respectively, and they are connected by a signal line inside the body, as shown in FIG. 4. Notches 620cc assist press fitting into the third accommodation portion 6c. A user may separate the composite connector 6cc by pressing the body 62cc the top and bottom surfaces of which are exposed to the outside, and may then use or replace the composite connector 6cc.

Figure 5:
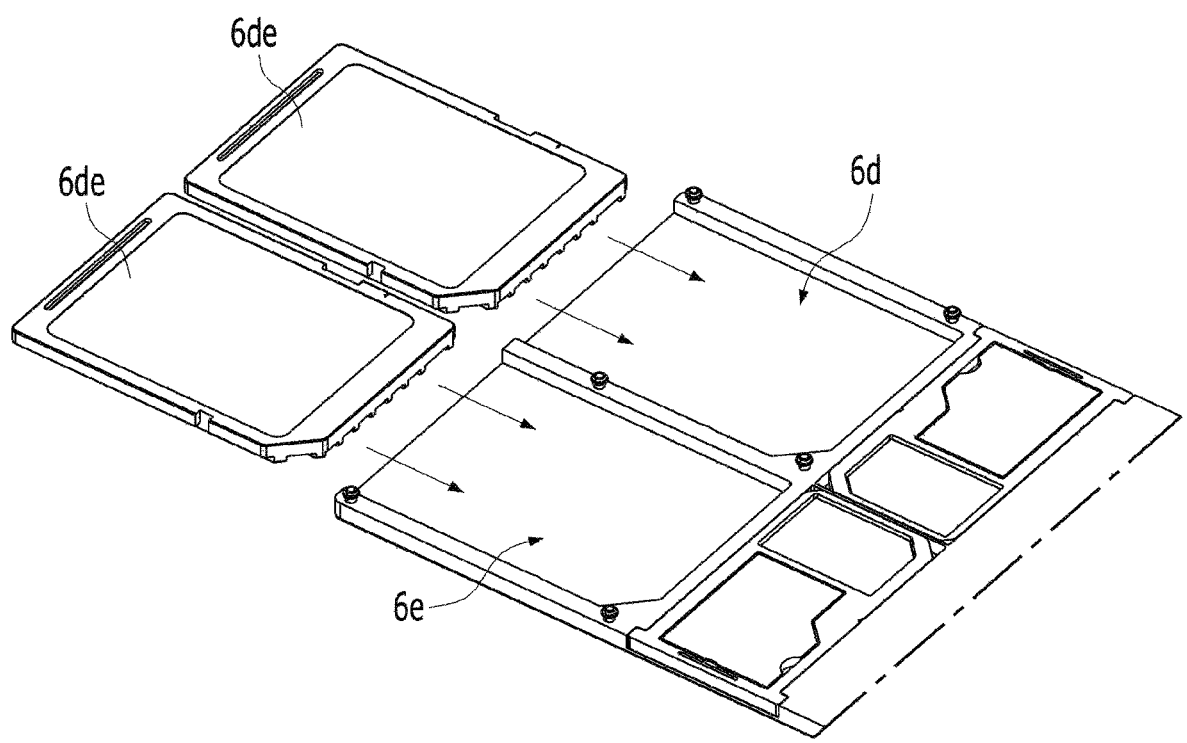
FIG. 5 is a perspective view of fourth and fifth accommodation portions and an SD card adaptor according to the present invention.

Next, as shown in FIG. 5, the fourth accommodation portion 6d and fifth accommodation portion 6e of the present invention are the same, and electronic parts that are accommodated therein are the same. The electronic parts are, for example, SD card adaptors 6de. The fourth accommodation portion 6d and the fifth accommodation portion 6e are each designed in accordance with the shape and size of the adaptor 6de. Although the adaptors 6de are well-known parts, they are significant in that when two adaptors 6de are arranged side by side, the maximum width of the portable multi-kit assembly 1 according to the present invention is determined and the arrangement and design of other parts may be changed in various manners accordingly.

Figure 6:
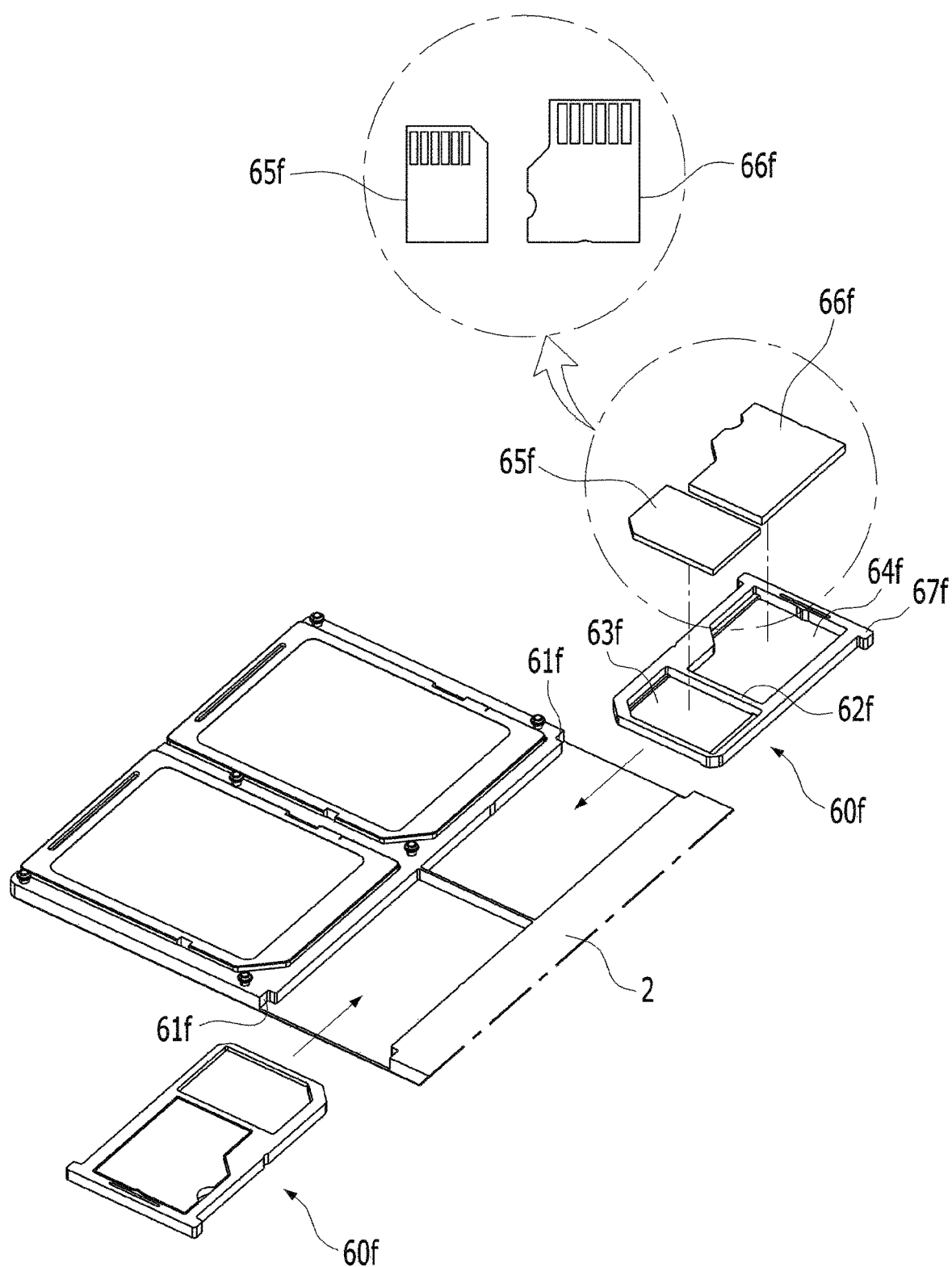
FIG. 6 is a perspective view of a sixth accommodation portion and an auxiliary frame according to the present invention.

Finally, as shown in FIG. 6, the sixth accommodation portion 6f of the present invention has a long rectangular shape that crosses the overall width of the base 2 in the center portion of the width of the base 2. Rectangular notches 61f are formed in the corners of the ends of both sides of the sixth accommodation portion 6f, and a pair of auxiliary frames 60f configured to accommodate electronic parts are inserted from left and right side surfaces and face each other without a gap.

Each of the auxiliary frames 60f is rectangular as a whole, and is divided into an inner first compartment 63f and an outer second compartment 64f by a crossbar 62f. The first compartment 63f accommodates a nano-USIM 65f, i.e., an electronic part, and thus has the same shape as a common micro-USIM adaptor that accommodates a nano-USIM. The second compartment 64f accommodates a micro-SD card 66f, and thus has an appropriate shape to accommodate the card. Rectangular stop protrusions 67f configured to engage with the notches 61f are formed on both sides of the bottom end of the second compartment 64f. The auxiliary frame 60f is designed to accommodate two electronic parts, and may be thus fabricated easily. The auxiliary frames 60f may implement a compact structure capable of accommodating a total of four parts in the center portion of the width of the base 2.

Figure 7:
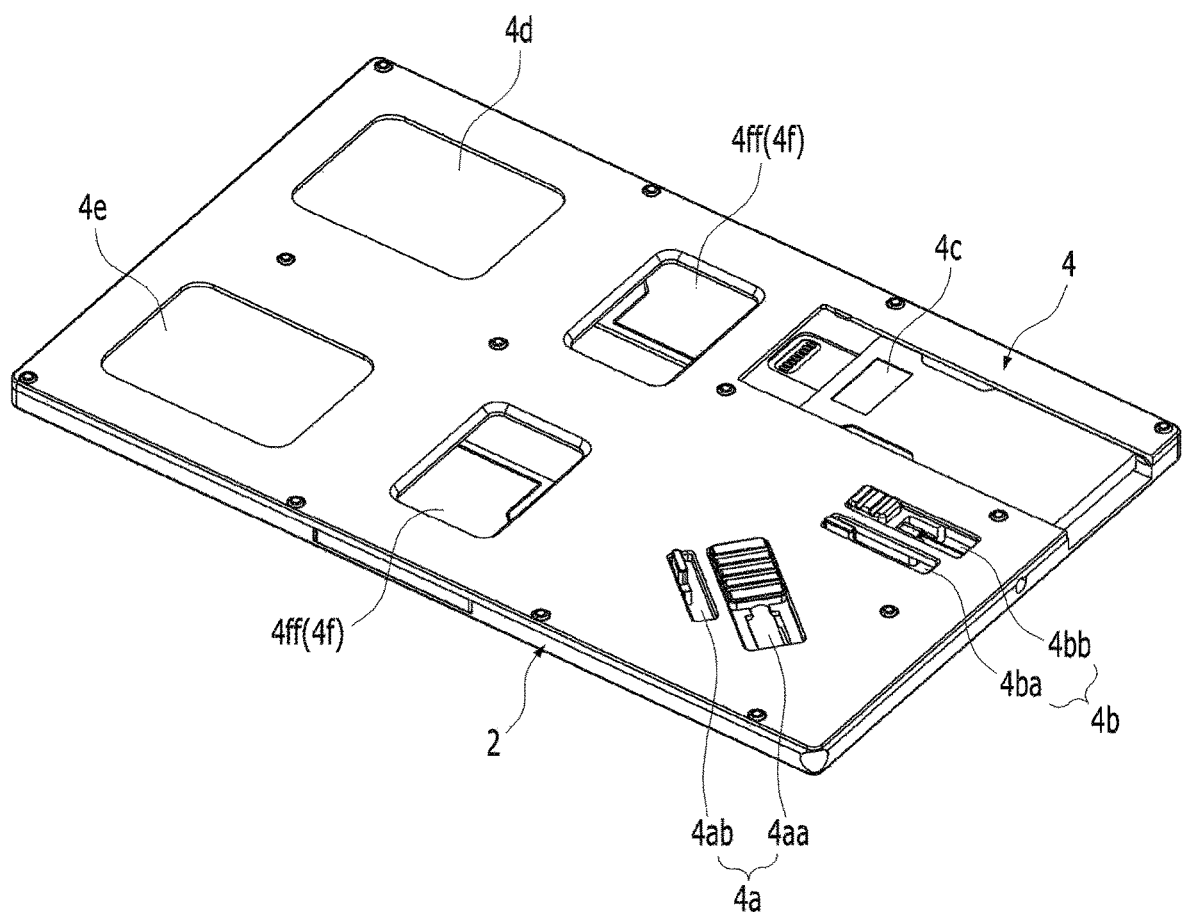
FIG. 7 is a perspective view showing a state in which the cover of the portable multi-kit assembly for storing electronic parts according to the present invention has been closed.

FIG. 7 is a perspective view showing a state in which the base 2 of the present invention is covered with the cover 4. The cover 4 is coupled to the base 2 by means of a press-fitting or button-pressing method. Windows 4a, 4b, 4c, 4d, 4e and 4f are formed in the cover 4 so that it may be possible to check parts seated on the accommodation portions and withdraw or retract parts.

The window 4a includes a first window 4aa through which the grip portion 601a is exposed to the outside and a second window 4ab through which the first push portion 604a is exposed to the outside. The window 4b also includes a first window 4bb through which the grip portion 601b is exposed to the outside and a second window 4ba through which the second push portion 604b is exposed to the outside. A user may push the composite connector 6cc to move it forward or backward while checking it through the window 4c, and may withdraw or retract the SD card adaptors 6de by pushing them to move them forward or backward through the windows 4d and 4e. The window 4f includes a pair of sub-windows 0ff having the same shape. The nano-USIM 65f and the micro-SD card 66f are withdrawn or retracted in a stepwise manner by pushing the auxiliary frames 61f to move them forward or backward through the sub-windows 4ff.

The above-described shapes of the windows are an example. The shapes of the windows may be freely changed as long as the functions of the present invention can be achieved in the case.

According to the present invention, the types and locations of parts may be checked through the windows of the cover 4 at any time and only a required part may be conveniently withdrawn or accommodated without opening the cover 4 from the base 2 and thus opening a considerable or overall portion of the base 2, which provides considerable convenience, reduces the risk of loss of parts, and improves merchantability.

Next, another embodiment of the present invention will be described with reference to FIGS. 9a and 9b. This embodiment is different from the previous embodiment in that a grip portion is not formed on the body of a kit but is disposed on a side surface.

Figure 9A:
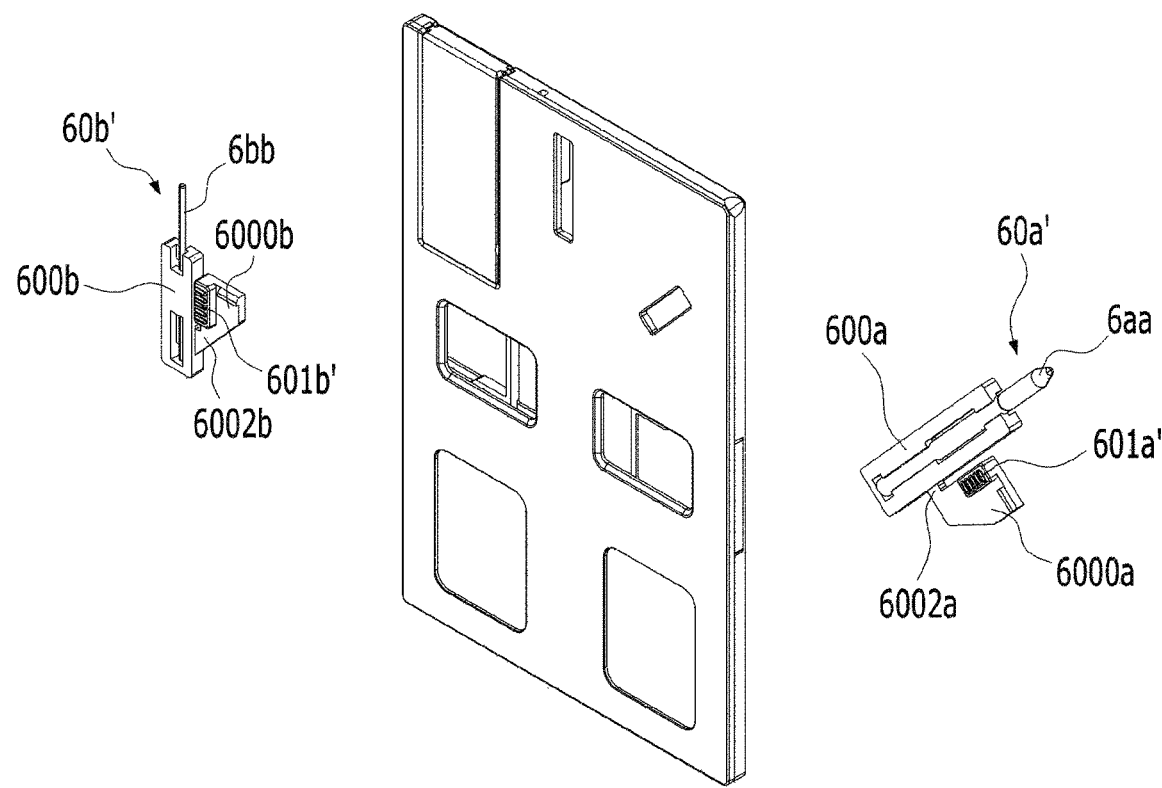
FIG. 9a is a perspective view showing other examples of the first coupling kit and the second coupling kit.

Referring to FIG. 9a, a first coupling kit 60a' includes a long rectangular body 600a which accommodates a pen 6aa, and a first flap portion 6000a which is integrated with the body 600a on one side surface of the body 600a through a connecting portion 6002a. Although the first flap portion 6000a has a trapezoidal shape the width of the bottom side of which is narrow in the illustrated example, it is not limited thereto. A grip portion 601a' on which depressions and protrusions are formed such that a user can push the grip portion 601a' with a finger is formed on the top surface of the first flap portion 6000a. The shape of a first accommodation portion 6a not shown in the drawing is formed to be complementary to that of the first coupling kit 60a'.

The second coupling kit 60b' includes a long rectangular body 600b which accommodates a reset pin 6bb, and a second flap portion 6000b which is integrated with a body 600b on one side surface of the body 600b through a connecting portion 6002b. A grip portion 601b' on which depressions and protrusions are formed such that a user can push the grip portion 601b' with a finger is formed on the top surface of the second flap portion 6000b. The shape of a first accommodation portion 6b not shown in the drawing is formed to be complementary to that of the second coupling kit 60b'.

The second coupling kit 60b' may be a charging connector or USB, not a reset pin. Accordingly, the above-described shapes and structures may be appropriately changed.

Figure 9B:
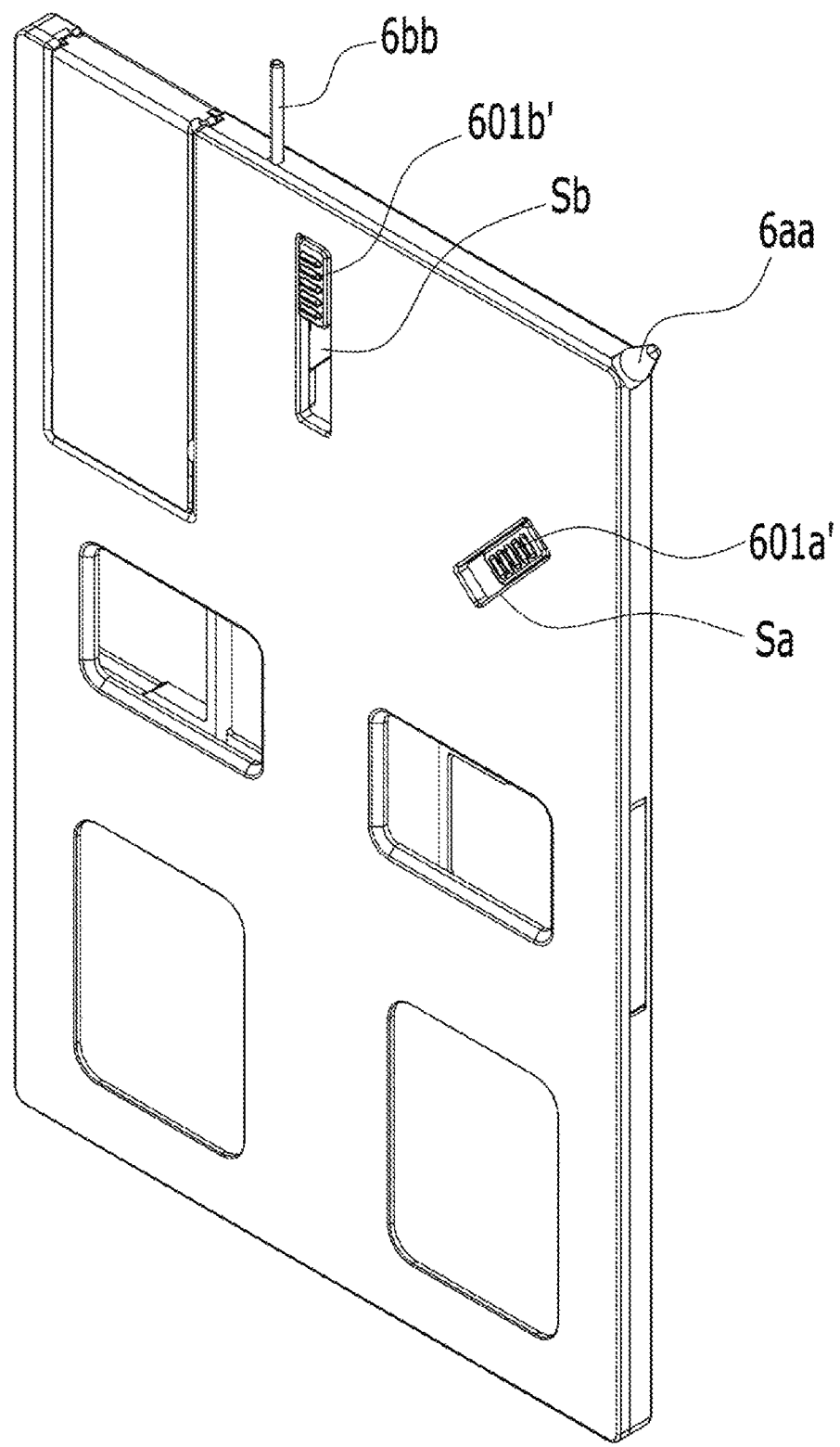
FIG. 9b is a perspective view showing a state in which the coupling kit of FIG. 9a has been accommodated in a cover.

Referring to FIG. 9b, a long rectangular shaped first slot Sa and a long rectangular shaped second slot Sb are formed in a cover 4. A grip portion 601a' is exposed through the first slot Sa, and a grip portion 601b' is exposed through the second slot Sb. In a state in which the grip portions 601a' and 601b' have been pushed along the slots Sa and Sb, respectively, outward, the tips of a pen 6aa and a reset pin 6bb are exposed to the outside, and thus a user may easily withdraw them.

The above structure does not require that the hook 602a or catch protrusion 603a is formed unlike the previous embodiment, and thus the fabrication and design of a kit are simple and cost may be reduced.

Although the preferred embodiments of the present invention have been described with reference to the accompanying drawings above, these are presented as examples, and thus the layout of the base and the sizes, shapes, locations, and arrangements of the individual members may be appropriately changed without limiting the scope of the present invention. For example, a light emitting means, such as an LED, may be placed on or in the top surface or slot of the kit or cover, thereby decorating appearance beautifully and also increasing visibility.

In particular, it should be noted that the first and second accommodation portions proposed by the present invention, the configurations of the parts to be accommodated in the first and second accommodation portions, and the third accommodation portion configured to accommodate a composite connector are novel configurations that have not been present so far and the fourth to sixth accommodation portions and their related configurations contribute to the implementation of a compact layout. The electronic parts that are mounted in the respective accommodation portions are not also limited to the above-described examples. For example, items, such as a USB equipped with an LED, etc., may be accommodated.

It will be apparent to those having ordinary knowledge in the art to which the present invention pertains that various alterations and modifications may be made without departing from the spirit of the present invention. The present invention is defined by the following claims.

INDUSTRIAL APPLICABILITY

The present invention is directed to a kit assembly for accommodating electronic components, and thus it is naturally industrially applicable.

The invention claimed is:
1. A portable multi-kit assembly for storing electronic parts, the portable multi-kit assembly comprising a base in which a plurality of accommodation portions configured to accommodate electronic parts are formed, wherein the plurality of accommodation portions comprise a first accommodation portion configured to accommodate a first part, the first part is fastened to the first accommodation portion and is coupled to a first coupling kit having a shape corresponding to that of the first accommodation portion and accommodated in the first accommodation portion, and a first grip portion is formed on the first coupling kit and allows the first part to be withdrawn from or retracted into the base in such a manner that the first grip portion is pushed with a finger,
wherein the first accommodation portion comprises a long rectangular first main accommodation portion and a small, long rectangular first auxiliary accommodation portion protruding from one side of the first main accommodation portion, a first stop portion is formed to protrude from one side of the first auxiliary accommodation portion, and a first fastening portion is formed to protrude from one end of the first auxiliary accommodation portion.

2. The portable multi-kit assembly of claim 1, wherein the first coupling kit comprises a body and the first grip portion protruding upward from a top surface of one side of the body, a guide configured to accommodate the first part is formed at a center of the body, a hook is formed from one side of the body in an integrated manner, and a catch protrusion having a shape identical to that of the first stop portion is formed on a side surface of the hook, so that the first coupling kit is slidable between a retracted position in which the catch protrusion engages with the first stop portion of the first accommodation portion and an advanced position in which the catch protrusion engages with the first fastening portion of the first accommodation portion.

3. The portable multi-kit assembly of claim 2, wherein the first part is a pen or electronic pen, which is a writing tool.

4. The portable multi-kit assembly of claim 1, wherein the plurality of accommodation portions comprise
a second accommodation portion configured to accommodate a second part, the second part is fastened to the second accommodation portion and is coupled to a second coupling kit having a shape corresponding to that of the second accommodation portion and accommodated in the second accommodation portion, and a second grip portion is formed on the second coupling kit and allows the second part to be withdrawn from or retracted into the base in such a manner that the second grip portion is pushed with a finger.

5. The portable multi-kit assembly of claim 4, wherein the second accommodation portion comprises a long rectangular second main accommodation portion and a small, long rectangular second auxiliary accommodation portion protruding from one side of the second main accommodation portion, a second stop portion is formed to protrude from one side of the second auxiliary accommodation portion, a second fastening portion is formed to protrude from one end of the second auxiliary accommodation portion, the second coupling kit comprises a body and the second grip portion protruding upward from a top surface of one side of the body, a guide configured to accommodate the second part is formed at a center of the body, a hook is formed from one side of the body in an integrated manner, and a catch protrusion having a shape identical to that of the second stop portion is formed on a side surface of the hook, so that the second coupling kit is slidable between a retracted position in which the catch protrusion engages with the second stop portion of the second accommodation portion and an advanced position in which the catch protrusion engages with the second fastening portion of the second accommodation portion.

6. The portable multi-kit assembly of claim 5, wherein the second part is a reset pin configured to reset a mobile phone.

7. The portable multi-kit assembly of claim 4, wherein the plurality of accommodation portion further comprises a third accommodation portion configured to accommodate a third part, and the third part is a hybrid-type composite connector in which a plug-side first module and an electronic device-side second module are formed in a body and the first and second modules are connected to each other by a signal line inside the body.

8. The portable multi-kit assembly of claim 7, wherein the plurality of accommodation portion further comprises a fourth accommodation portion configured to accommodate a fourth part and a fifth accommodation portion, the fourth part is an adaptor, and the fourth accommodation portion and the fifth accommodation portion are arranged adjacent to each other side by side.

9. The portable multi-kit assembly of claim 8, wherein the plurality of accommodation portion further comprises a sixth accommodation portion configured to accommodate a sixth part, a pair of auxiliary frames configured to accommodate electronic parts are inserted into the sixth accommodation portion from left and right side surfaces of the sixth accommodation portion and face each other, each of the auxiliary frames is divided into an inner first compartment and an outer second compartment by a crossbar, the first compartment accommodates a nano-USIM, and the second compartment accommodates an SD card.

10. The portable multi-kit assembly of claim 4, further comprising a cover which selectively opens and closes the base, wherein windows are formed in the cover so that the first and second parts seated on the first and second accommodation portions, respectively, are checked with eyes and are withdrawn or retracted.

11. The portable multi-kit assembly of claim 1, wherein the first coupling kit comprises a body configured to accommodate the first part and a first flap portion integrated with the body on one side surface of the body through a connecting portion, and the first grip portion on which depressions and protrusions are formed such that the first grip portion is pushed with a finger is formed on a top surface of the first flap portion.

12. The portable multi-kit assembly of claim 4, wherein the second coupling kit comprises a body configured to accommodate the second part and a second flap portion integrated with the body on one side surface of the body through a connecting portion, and the second grip portion on which depressions and protrusions are formed such that the second grip portion is pushed with a finger is formed on a top surface of the second flap portion.

* * * * *